E. FETTER.

VULCANIZING APPARATUS AND PROCESS.

APPLICATION FILED JAN. 10, 1921.

Reissued Apr. 5, 1921. 15,076.

Inventor

Edward Fetter.

Witnesses.

Porter W. Hewitt.

Anna Bernstein

By Albert G. Davis

Attorney

UNITED STATES PATENT OFFICE.

EDWARD FETTER, OF BALTIMORE, MARYLAND, ASSIGNOR TO THE PNEUMATIC TUBE STEAM SPLICER COMPANY, OF BALTIMORE, MARYLAND, A CORPORATION OF MARYLAND.

VULCANIZING APPARATUS AND PROCESS.

15,076. Specification of Reissued Letters Patent. Reissued Apr. 5, 1921.

Original No. 1,312,029, dated August 5, 1919, Serial No. 262,351, filed November 13, 1918. Application for reissue filed January 10, 1921. Serial No. 436,355.

*To all whom it may concern:*

Be it known that I, EDWARD FETTER, a citizen of the United States of America, residing at Baltimore, in the State of Maryland, have invented certain new and useful Improvements in Vulcanizing Apparatus and Processes, of which the following is a specification.

My invention relates to improvements in vulcanizing apparatus and process, and it consists in the combinations, constructions and arrangements herein described and claimed, and in the steps hereinafter set forth.

An object of my invention is to provide a device by means of which the ends of inner tubes of pneumatic tires may be "spliced," *i. e.*, joined together quickly and economically by vulcanizing the ends instead of merely cementing them, by the use of acid or other cementing agencies.

A further object of my invention is to provide a vulcanizing device consisting of a hollow cylinder with means for heating the outside surface of the cylinder; over an end of which cylinder the tube may be turned back upon itself or cuffed, so as to bring the splice next to the outside, *i. e.*, the heated surface of the cylinder, for carrying out the vulcanizing process.

Another object of my invention is to provide a method by which the splice receives the full heating effect from the vulcanizing surface, giving increased efficiency and preventing unnecessary heating at other parts of the tube.

A further object of my invention is to provide a process by means of which the tube may be placed on the vulcanizer and will grip the vulcanizer tightly, thus dispensing with the need of a clamp, or other holding device, the subsequent steps of the process causing the tube to release its grip and to force itself off from the vulcanizer.

Other objects and advantages will appear in the following specification, and the novel features of the invention will be particularly pointed out in the appended claims.

My invention is illustrated in the accompanying drawings, forming part of this application, in which—

In "splicing" the ends of inner tubes of pneumatic tires, *i. e.*, in joining the ends together, the ordinary method is to make use of some cementing agent which acts without heat, such as the well-known acid cement, instead of vulcanizing the joint by heat treatment, because of the fact that heretofore no device has been made which is successful and economical in forming the joint in this way. The result has been that, when these tubes are used in tires which are subjected to great heat, as for instance in the tires of racing automobiles, the heat will cause the joint to loosen, thus destroying the utility of the tire. The present invention is designed to vulcanize the joint so as to afford a perfect splicing of the tube ends.

Figure 3:
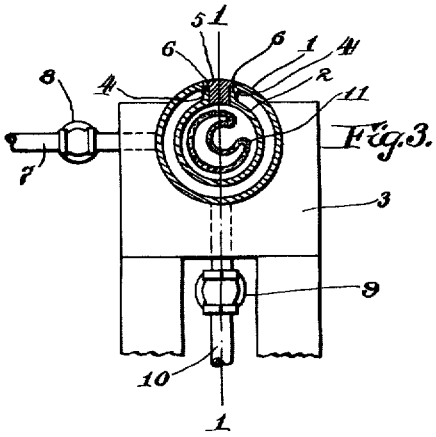
Fig. 3 is a transverse section through the vulcanizer on the line 3—3 of Fig. 1.

In carrying out my invention I provide a hollow metal cylinder, 1, having double walls to provide a steam space, 2, for heating the outer surface, 12, of the cylinder or mandrel which is the vulcanizing surface. The cylinder is designed to be held rigidly in position by any suitable means, such as the support 3. As will be seen from the drawings, the ends of the steam space are closed. The cylinder is provided with a longitudinal slot, the walls of this slot being continued across the steam space, as shown in Fig. 3, so as to prevent the escape of steam.

In the preferred form as shown, I have provided shoulders, 4, near the outer side of the cylinder at each side of the slot. A bar, 5, having flanges, 6, arranged to rest on the shoulders, 4, is provided, the outer and inner surfaces of the bar being curved to conform with the outer and inner surfaces of the cylinder, and being flush therewith when the bar is in position. A suitable steam inlet, 7, is provided, a valve 8, controlling the inlet, while a valve, 9, controls an outlet, 10.

From the foregoing description of the various parts of the device, the operation thereof may be readily understood. The cylinder, 1, is slightly larger in diameter than the diameter of the tube, 11, whose ends are to be spliced. I, therefore, enlarge the tube by pumping compressed air into the tube before placing it in position on the vulcanizer. Before doing this, however, the bar, 5, is removed from the slot by pulling it outwardly, and the deflated tube whose ends have been previously treated with cementing material suitable for the hot treatment and lapped to form the splice, is passed through the slot after which the bar is replaced in position. Preferably, the tube is now pumped up as stated, and inflated to a diameter greater than that of the mandrel, so that the portion of the tube at which the joint is located, may be forced over one end of the vulcanizing cylinder. An important feature of my method consists in so performing this step that the lapped or spliced portion of the tube is brought next to, *i. e.*, in direct contact with the outer heating surface of the cylinder or mandrel, giving direct heating of the splice with increased efficiency and speed and avoiding unnecessary heating of other portions of the tube. The air is now let out of the tube and the latter, on contracting, will cling tightly to the surface of the vulcanizer, but any suitable additional clamping means for holding it close to the vulcanizing surface during the process of vulcanizing may be used.

Figure 1:
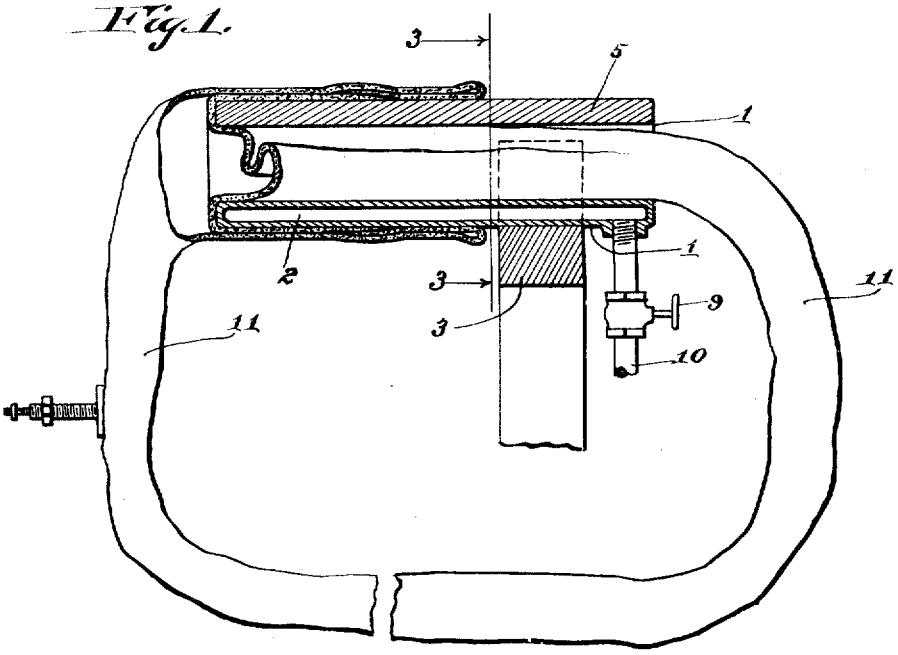
Figure 1 is a longitudinal section through the vulcanizer and through a portion of the inner tube, the major portion of the tube being shown in elevation.
Figure 2:
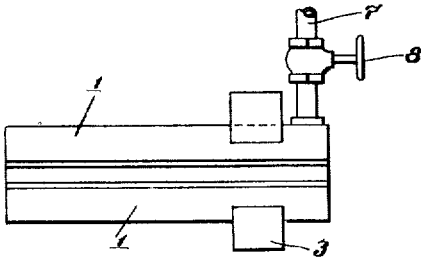
Fig. 2 is a plan view of the vulcanizing device.

Fig. 1 shows the position of the parts at this stage of the operation. It is now only necessary to admit steam to the steam space 2 in order to supply the heat necessary for the vulcanizing action. The time for vulcanizing depends upon the composition of the tube. I contemplate using a battery of vulcanizing cylinders of such a number that the time taken to fit the tubes on the cylinders will be substantially the time taken to vulcanize the tube on the first cylinder. This may vary from five to fifteen minutes more or less.

When the joint has been vulcanized it is only necessary to admit compressed air to the tube, when the latter will force itself off from the end of the mandrel. The result is a joint or splice which is vulcanized as well as any portion of the tube. In the drawings, the end of one section of the tube may be seen in place on the vulcanizer, but in the finished joint there is no line to show where the splice has been made.

While I have shown a cylinder of a certain size and supported in a certain manner in the drawings, it will be understood that the cylinders are to be made in various sizes and may be supported in any suitable manner without departing from the spirit and the scope of the invention.

I claim:

1. A vulcanizing device comprising a hollow cylinder having double walls to provide a steam space, and a slot to permit the entrance of a rubber tube, a closure for the slot having flanges arranged to engage the walls of the slot for positioning the closure, said closure being movable into and out of position in the slot in a radial direction, and the outer and inner faces of the closure forming a continuation of the outer and inner faces of the cylinder, and being flush therewith throughout the length of the cylinder.

2. The herein described steps of vulcanizing a joint of a rubber tube on a hollow heated cylinder which consist in admitting compressed air into the tube to expand the same, and subsequently forcing the portion of the tube containing the joint back upon itself and over the outer surface of the cylinder to bring the outer surface of the joint next to the surface of the cylinder.

3. The herein described steps in a process of vulcanizing a joint of a rubber tube on a hollow heated cylinder which consists in forcing the portion of the tube containing the joint back upon itself and over the outer surface of the cylinder to bring the outer surface of the joint next to the surface of the cylinder, heating the cylinder, and subsequently forcing compressed air into the tube whereby the tube is forced out from the cylinder.

4. The herein described process of vulcanizing a joint of a rubber tube on a hollow heated cylinder, which consists in admitting compressed air into the tube, forcing the portion of the tube containing the joint back upon itself and over the outer surface of the cylinder to bring the outer surface of the joint next to the surface of the cylinder, releasing the air from the tube whereby the latter is caused to grip the surface of the cylinder, heating the cylinder, and subsequently forcing compressed air into the tube whereby the tube is forced off from the cylinder.

5. The process of splicing the ends of a tube of rubber or similar material to form an inner tube for pneumatic tires which consists in forming the ends of the tube and cuffing the tube into a vulcanizable splice over a mandrel bringing the splice directly in contact with the outer surface of the mandrel and supplying heat to the said outer surface of the mandrel to cure and vulcanize the splice.

Signed by me at Baltimore, Maryland, this 6th day of January, 1920.

EDWARD FETTER.

Witnesses:
JAMES JOYCE,
PORTER H. FLAUTT.

Corrections in Reissue Letters Patent No. 15,076.

It is hereby certified that in Reissue Letters Patent No. 15,076, granted August 5, 1919, upon the application of Edward Fetter, of Baltimore, Maryland, for an improvement in "Vulcanizing Apparatus and Processes," errors appear in the printed specification requiring correction as follows: Page 2, line 114, claim 5, after the word "tube" insert the words *into a vulcanizable splice;* same page and claim, line 115, strike out the words "into a vulcanizable splice;" and that the said Letters Patent should be read with these corrections therein that the same may conform to the record of the case in the Patent Office.

Signed and sealed this 3d day of May, A. D., 1921.

[SEAL.]

T. E. ROBERTSON,

*Commissioner of Patents.*

Cl. 18—45.